(12) United States Patent
Huang et al.

(10) Patent No.: US 8,230,923 B2
(45) Date of Patent: *Jul. 31, 2012

(54) CONTROLLING COAL FINES IN COAL BED OPERATIONS

(75) Inventors: Tianping Huang, Spring, TX (US); James B. Crews, Willis, TX (US); Allen D. Gabrysch, Houston, TX (US); Rick M. Jeffrey, Tomball, TX (US)

(73) Assignee: Baker Hughes Incorporated, Houston, TX (US)

( * ) Notice: Subject to any disclaimer, the term of this patent is extended or adjusted under 35 U.S.C. 154(b) by 338 days.

This patent is subject to a terminal disclaimer.

(21) Appl. No.: 12/546,763

(22) Filed: Aug. 25, 2009

(65) Prior Publication Data

US 2010/0000734 A1    Jan. 7, 2010

Related U.S. Application Data

(63) Continuation-in-part of application No. 12/277,825, filed on Nov. 25, 2008, and a continuation-in-part of application No. 11/931,501, filed on Oct. 31, 2007, now Pat. No. 7,721,803, which is a continuation-in-part of application No. 11/931,706, filed on Oct. 31, 2007.

(51) Int. Cl.
*E21B 43/04* (2006.01)
*E21B 43/267* (2006.01)

(52) U.S. Cl. ...... 166/278; 166/276; 166/279; 166/308.3

(58) Field of Classification Search .................. None
See application file for complete search history.

(56) References Cited

U.S. PATENT DOCUMENTS

| | | | |
|---|---|---|---|
| 4,031,959 | A | 6/1977 | Henderson |
| 5,518,996 | A | 5/1996 | Maroy et al. |
| 5,775,425 | A | 7/1998 | Weaver et al. |
| 6,860,924 | B2 | 3/2005 | Rajagopalan et al. |
| 7,081,439 | B2 | 7/2006 | Sullivan et al. |
| 7,131,491 | B2 | 11/2006 | Blauch et al. |
| 7,204,311 | B2 | 4/2007 | Welton et al. |
| 7,258,170 | B2 | 8/2007 | Nguyen et al. |
| 7,543,646 | B2 | 6/2009 | Huang et al. |
| 7,550,413 | B2 | 6/2009 | Huang et al. |
| 2003/0155302 | A1 | 8/2003 | Meng et al. |
| 2005/0107265 | A1 | 5/2005 | Sullivan et al. |
| 2005/0252658 | A1 | 11/2005 | Willingham et al. |
| 2006/0065398 | A1* | 3/2006 | Brannon et al. ........... 166/280.2 |
| 2006/0113080 | A1 | 6/2006 | Nguyen et al. |
| 2007/0036977 | A1 | 2/2007 | Sinclair et al. |
| 2007/0066491 | A1 | 3/2007 | Bicerano et al. |
| 2007/0104923 | A1 | 5/2007 | Whitaker et al. |
| 2007/0151726 | A1 | 7/2007 | Crews et al. |
| 2008/0023201 | A1 | 1/2008 | Huang et al. |
| 2008/0060812 | A1 | 3/2008 | Huang et al. |
| 2008/0087429 | A1 | 4/2008 | Brannon et al. |
| 2008/0099207 | A1 | 5/2008 | Venditto et al. |
| 2008/0248978 | A1 | 10/2008 | Huang et al. |
| 2009/0111718 | A1 | 4/2009 | Gadiyar et al. |
| 2009/0312201 | A1 | 12/2009 | Huang et al. |

FOREIGN PATENT DOCUMENTS

WO  2008036812 A2  3/2008
WO  2009063165 A1  5/2009

OTHER PUBLICATIONS

Y. Taguchi et al., Preparation of find composite particles composed of inorganic solid powders and organic polymers by utilizing liquid-liquid dispersion, Colloids and Surfaces A: Physiochemical and Engineering Aspects, vol. 153, 1999, pp. 401-404 (XP002530896).
J. Hibbeler, et al., "An Integrated Long-Term Solution for Migratory Fines Damages," SPE 81017, SPE Latin American and Caribbean Petroleum Engineering Conference, Apr. 27-30, 2003, pp. 1-11, Port-of-Spain, Trinidad, West Indies.
P.D. Nguyen, et al., "Controlling Formation Fines at Their Sources to Maintain Well Productivity," SPE 97659, SPE International Improved Oil Recovery Conference in Asia Pacific, Kuala Lumpur, Dec. 5-6, 2005; republished SPE Production & Operations, May 2007, pp. 202-215.

* cited by examiner

*Primary Examiner* — Zakiya W Bates
(74) *Attorney, Agent, or Firm* — Mossman Kumar & Tyler PC

(57) ABSTRACT

The migration of coal fines within a bed is reduced, inhibited or constrained by contacting the fines with nanoparticles, such as magnesium oxide crystals having an average particle size of about 30 nm. These nanoparticles may coat a proppant during the fracturing of a subterranean formation to produce methane from a coal bed therein. The nanoparticles may also treat a proppant pack in a fractured coal bed. The nanoparticles cause the coal fines to thus bind to or associate with the proppants. Thus, most of the coal fines entering fractures away from the near-wellbore region will be restrained or controlled near their origin or source and the production of methane at a desired level will be maintained much longer than a similar situation than where the nanoparticles are not used.

15 Claims, 4 Drawing Sheets

CONTROLLING COAL FINES IN COAL BED OPERATIONS

CROSS-REFERENCE TO RELATED APPLICATIONS

This application is a continuation-in-part patent application of U.S. Ser. No. 11/931,501 filed Oct. 31, 2007 issued May 25, 2010 as U.S. Pat. No. 7,721,803; and a continuation-in-part patent application of U.S. Ser. No. 12/277,825 filed Nov. 25, 2008; which in turn is a continuation-in-part patent application of U.S. Ser. No. 11/931,706 also filed Oct. 31, 2007.

TECHNICAL FIELD

The present invention relates to methods and compositions for fixating coal fines from migrating, and more particularly relates, in one non-limiting embodiment, to methods and compositions for fixating or inhibiting coal fines in subterranean formations from migrating during methane recovery operations from subterranean coal beds.

BACKGROUND

Coal bed methane (CBM) or coal bed gas is a form of natural gas extracted from coal beds. In recent decades it has become an important source of energy. In some areas it is known as coal seam gas. The removal of such methane gas is termed coal bed methane extraction.

The term refers to methane adsorbed into the solid matrix of the coal. It is called "sweet gas" because of its lack of hydrogen sulfide. The presence of this gas is well known from its occurrence in underground coal mining, where it presents a serious safety risk. CBM is distinct from a typical sandstone, carbonate or other conventional gas reservoir, as the methane is stored within the coal by adsorption. The methane is in a near-liquid state, lining the inside of pores within the coal (called the matrix). The open fractures in the coal (also called the cleats) may also contain free gas or can be saturated with water.

Since the methane is absorbed into the solid coal matrix, it may be released when the coal seam is depressurized. This often involves drilling a hole into the coal seam and artificially introducing fractures into the seam by hydraulic fracturing techniques similar to those used in recovering hydrocarbons from subterranean formations. Hydraulic fracturing generates long, proppant-supported fractures to release the methane with water in the coal bed. Coal fines (the average particle size is usually less than 50 microns) are carried by methane and water flowing from all directions to the fractures, and then through the fractures to the wellbore for production at the surface. During the methane production, the coal fines will be concentrated at and will plug the flow channels in the near wellbore region, which results in a rapid reduction of production rate.

It would be desirable if methods and/or compositions would be devised to help fix in location or stabilize coal fines in all of its forms and embodiments, particularly those where the coal fines are present in a fluid, such as suspended in air or water. In a particular case, it would be desirable if coal fines within a coal bed in a subterranean formation were treated in such a way that their migration and movement is reduced, inhibited or eliminated.

SUMMARY

There is provided, in one non-limiting form, a method for fixating coal fines in a subterranean formation that involves contacting coal fines in a subterranean formation with an amount of a particulate additive which is effective to reduce coal fines migration and movement. The particulate additive may have a mean particle size of 100 nm or less. Further, the particulate additive may be an alkaline earth metal oxide, an alkaline earth metal hydroxide, an alkali metal oxide, an alkali metal hydroxide, a transition metal oxide, a transition metal hydroxide, a post-transition metal oxide, a post-transition metal hydroxide, piezoelectric crystals, pyroelectric crystals, and mixtures thereof.

There is also provided in one non-restrictive embodiment, a method for fixating coal fines in a subterranean coal bed. The method includes releasing methane from the subterranean coal bed (as in a CBM recovery operation) and contacting the coal fines in the subterranean coal bed with an amount of a particulate additive that is effective to reduce coal fines migration. The coal fines are present in a fluid including, but not necessarily limited to, aqueous fluids, hydrocarbon fluids, alcohols, glycols, and mixtures thereof. The particulate additive may be as described previously. Fines migration is reduced as compared to an identical fluid absent the particulate additive.

There is additionally provided in another non-limiting embodiment a coal-fines containing fluid. The fluid may include a base fluid that may involve, but is not necessarily limited to, aqueous fluids such as water and/or brines, hydrocarbon fluids, non-aqueous fluids such as alcohols and/or glycols, and mixtures thereof. The fluid also contains coal fines and the particulate additive previously described. The amount of the particulate additive within the fluid is sufficient to inhibit the ability of the coal fines to move within the fluid.

The particulate additives, also referred to herein as nano-sized particles or nanoparticles (e.g. MgO and/or Mg(OH)$_2$, and the like), appear to fixate or flocculate dispersed coal fines, whether or not they are charged. These particulate additives have been previously proven to fixate clay fines, which are generally charged. It is believed that coal fines generally are not charged, whereas clay fines generally do carry charges. Due to at least in part to their small size, the surface forces (like van der Waals and electrostatic forces) of nanoparticles help them associate, group or flocculate the fines together in larger collections, associations or agglomerations. Such groupings or associations help fix the fines in place and keep or inhibit them from moving. In many cases, fines fixing ability of the treating fluids may be improved by use of nano-sized particulate additives that may be much smaller than the pores and pore-throat passages, fractures and passages within a coal bed, thereby being non-pore plugging particles that are less damaging to the bed permeability than the fines themselves. This smaller size permits the nanoparticles to readily enter the bed, and then bind up or fix the fines in place at or near their sources or origins so that both the fines and the nanoparticles remain in the bed and do not travel as far—or at least are restrained to the point that damage to the near-wellbore region of the coal bed is minimized.

The addition of alkaline earth metal oxides, such as magnesium oxide; alkaline earth metal hydroxides, such as calcium hydroxide; transition metal oxides, such as titanium oxide and zinc oxide; transition metal hydroxides; post-transition metal oxides, such as aluminum oxide; post-transition metal hydroxides; piezoelectric crystals and/or pyroelectric crystals such as ZnO and AlPO$_4$, to an aqueous fluid, or solvent-based fluid such as glycol, or oil-base fluid which is then introduced into a subterranean formation is expected to prevent or inhibit or fixate troublesome fines in the coal bed, and prevent or minimize the damage they may cause to the methane productivity.

DETAILED DESCRIPTION

Figure 1:
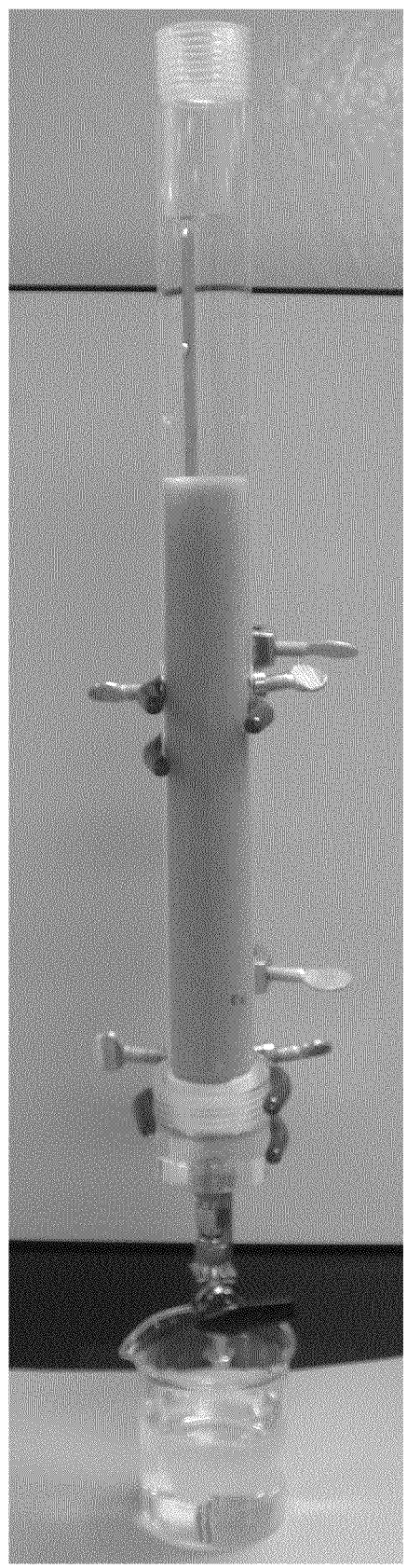
FIG. 1 is a photograph of tap water flowing through a sand pack that contains no coal fines or nanoparticles.

It has been discovered that nanoparticles, such as magnesium oxide having an average particle size of about 30 nm, coating a proppant during a fracturing process, or used to treat the proppant pack in a fractured coal bed, will inhibit, prevent and fixate coal fines within the proppant pack and/or coal bed and largely prevent them from migrating or moving. The nanoparticles in the proppant pack will hold coal fines and keep them from moving through the effects of the surface forces (van de Waals force, electrostatic force, etc.) of the nanoparticles, in one non-limiting explanation. That process will keep most of coal fines in place in fractures away from the near wellbore region and maintain methane production at the desired rate much longer than that of a coal bed not treated with nanoparticles.

Coal fines migration has been troublesome during CBM production, as well as during many methane recovery operations including, but not necessarily limited to, fracturing procedures and the like. Many of the coal fines that migrate and then collect and accumulate, causing damage and/or blockage of the near wellbore region are not believed to have a charge. There may be charges present in coal, in particular on the impurities present within or mineralized within the coal. Lower grade coals often have charge-related impurities. As defined herein, coal fines are particles having an average particle size less than about 50 microns, alternatively less than about 37 microns (μm).

It has been discovered that nano-sized particles like magnesium oxide (MgO) may be used to fixate coal fines in subterranean coal bed formations to inhibit, restrain or prevent them from migrating or moving from their sources or origins to near-wellbore regions to choke or damage the production of methane. Some nano-sized particles, also called nanoparticles herein, not only have high surface areas compared to their small sizes, but also have relatively high surface charges that permit them to associate or connect other particles together, including other charged particles, but also other non-charged particles. In one non-limiting embodiment, these associations or connections between the fines and the nano-sized particles are due to electrical attractions and other intermolecular forces or effects.

As will be shown, laboratory tests have demonstrated that relatively small amounts of MgO nanoparticles can fixate and inhibit the movement of dispersed coal fines. Other nanoparticles such as ZnO, $Al_2O_3$, zirconium dioxide ($ZrO_2$), $TiO_2$, cobalt (II) oxide (CoO), nickel (II) oxide (NiO), and pyroelectric and piezoelectric crystals may also be used in the methods and compositions herein.

The nanoparticles may be pumped with a carrier fluid downhole deep within the formation to fixate coal fines within fractures in a coal bed. Optionally, these nanoparticles may be coated in dry form or slurry form on proppant or sand at the surface or during placement downhole for frac-pack and gravel pack applications to fixate formation fines during these procedures.

Nano-sized particles of alkaline earth metal oxides, alkaline earth metal hydroxides, alkali metal oxides, alkali metal hydroxides, transition metal oxides, transition metal hydroxides, post-transition metal oxides, and post-transition metal hydroxides, piezoelectric crystals, pyroelectric crystals, and mixtures thereof have been discovered to have particular advantages for fixating coal fines and inhibiting or preventing their undesired migration and movement, rather than allowing them to damage production of the near-wellbore region of the reservoir.

Magnesium oxide particles and powders have been suitably used to fixate fines herein. However, it will be appreciated that although MgO particles are noted throughout the description herein as one representative or suitable type of alkaline earth metal oxide and/or alkaline earth metal hydroxide particle, other alkaline earth metal oxides and/or alkaline earth metal hydroxides and/or transition metal oxides, transition metal hydroxides, post-transition metal oxides, and post-transition metal hydroxides, piezoelectric crystals, pyroelectric crystals, may be used in the methods and compositions herein. Additionally, the alkali metal oxides and/or hydroxides may be used alone or in combination with the alkaline earth metal oxides and hydroxides, and/or together with one or more transition metal oxide, transition metal hydroxide, post-transition metal oxide, post-transition metal hydroxide, piezoelectric crystal, and pyroelectric crystal.

By "post-transition metal" is meant one or more of aluminum, gallium, indium, tin, thallium, lead and bismuth. In another non-limiting embodiment herein, the nano-sized particles are oxides and hydroxides of elements of Groups IA, IIA, IVA, IIB and IIIB of the previous IUPAC American Group notation. These elements include, but are not necessarily limited to, Li, Na, K, Mg, Ca, Ti, Zn and/or Al.

The nano-sized particulate additives herein may also be piezoelectric crystal particles (which include pyroelectric crystal particles). Pyroelectric crystals generate electrical charges when heated and piezoelectric crystals generate electrical charges when squeezed, compressed or pressed.

In one non-limiting embodiment, specific suitable piezoelectric crystal particles may include, but are not necessarily limited to, ZnO, berlinite ($AlPO_4$), lithium tantalate ($LiTaO_3$), gallium orthophosphate ($GaPO_4$), $BaTiO_3$, $SrTiO_3$, $PbZrTiO3$, $KNbO_3$, $LiNbO_3$, $LiTaO_3$, $BiFeO_3$, sodium tungstate, $Ba_2NaNb_5O_5$, $Pb_2KNb_5O_{15}$, potassium sodium tartrate, tourmaline, topaz and mixtures thereof. The total pyroelectric coefficient of ZnO is $-9.4 C/m^2K$. ZnO and these other crystals are generally not water soluble.

In one non-limiting explanation, when the aqueous carrier fluid mixed with very small pyroelectric crystals, such as nano-sized ZnO, is pumped downhole into underground formations that are under high temperature and/or pressure, the pyroelectric crystals are heated and/or pressed and high surface charges are generated. These surface charges permit the crystal particles to associate, link, connect or otherwise relate the coal fines together to fixate them together and also to the surrounding formation surfaces. No formation damage is expected from the use of the nano-sized particulate additives.

In one non-limiting embodiment, the nano-sized solid particulates and powders useful herein include, but are not necessarily limited to, slowly water-soluble alkaline earth metal oxides or alkaline earth metal hydroxides, or mixtures thereof. In one non-limiting embodiment, the alkaline earth metal in these additives may include, but are not necessarily limited to, magnesium, calcium, barium, strontium, combinations thereof and the like. In one non-limiting embodiment, MgO may be obtained in high purity of at least 95 wt %, where the balance may be impurities such as $Mg(OH)_2$, CaO, $Ca(OH)_2$, $SiO_2$, $Al_2O_3$, and the like.

In another non-limiting embodiment, the particle size of the additives and agents ranges between about 1 nanometer independently up to about 500 nano-meter. In another non-limiting embodiment, the particle size ranges between about 4 nanometers independently up to about 100 nanometer. In another non-restrictive version, the particles may have a mean particle size of about 100 nm or less, alternatively about 90 nm or less, and in another possible version about 50 nm or less, alternatively 40 nm or less.

The amount of nano-sized particles in the aqueous fluid may range from about 2 to about 300 pptg (about 0.24 to about 36 kg/1000 liters). Alternatively, the lower threshold of the proportion range may be about 5 pptg (about 0.6 kg/1000 liters), while the upper threshold of proportion of the particles may independently be about 100 pptg (about 12 kg/1000 liters) pptg.

The nano-sized particles herein may be added, in one non-limiting example, in dry, powder form to dry proppant particles. The nano-sized particles may be added, in another non-limiting example, in powder form to the aqueous treating fluids prior to pumping downhole or other application. In another non-limiting example the nano-sized particles herein may be added in slurry form (such as slurried within water, brine, glycol, glycol ether, alcohol, diesel, oils, mixtures, and the like as non-limiting examples) to the aqueous treating fluid prior to use. The nano-sized particles herein may be added along with the aqueous treating fluids prior to pumping downhole or other application, and may be added before, during or after the proppant particles are added to the fracturing or other treatment fluid. The aqueous base fluid could be, for example, water, brine, aqueous-based foams or water-alcohol mixtures. The brine base fluid may be any brine, conventional or to be developed which serves as a suitable media for the various components. As a matter of convenience, in many cases the brine base fluid may be the brine available at the site used in a fracturing fluid or other application, for a non-limiting example.

More specifically, and in non-limiting embodiments, the brines may be prepared using salts including, but not necessarily limited to, NaCl, KCl, $CaCl_2$, $MgCl_2$, $NH_4Cl$, $CaBr_2$, NaBr, sodium formate, potassium formate, and other commonly used brine salts. The concentration of the salts to prepare the brines may be from about 0.5% by weight of water up to near saturation for a given salt in fresh water, such as 10%, 20%, 30% and higher percent salt by weight of water. The brine may be a combination of one or more of the mentioned salts, such as a brine prepared using KCl, NaCl and $CaCl_2$, or NaCl, $CaCl_2$, and $CaBr_2$ as non-limiting examples. In application, the nano-sized particulate additives of MgO (or other particulate) may be mixed in powder or slurry form with the carrier fluids at the surface before they are pumped downhole. The carrier fluids may not contain other particles or proppant agents when pumped downhole. However, in many cases the carrier fluid will contain other solids, like proppant particles. When proppant particles are added, at least a portion of the nanoparticles may plate out or become fixated onto the proppant during initial mixing and treatment fluid placement. No coating agent is required for the nanoparticles to plate out onto proppant in an aqueous treatment fluid. That is, the particulate additive may be added as a dry powder to the carrier or treatment fluid, or additionally or alternatively, the dry proppant prior to adding the proppant to the carrier or treatment fluid. In many cases, however, a coating agent may be used to increase, speed up, or improve the plating out of the nano-sized particles onto proppant particles in an aqueous carrier fluid.

In another non-limiting embodiment, the nano-sized particles herein may be added to a non-aqueous fluid during a treatment. For example, the MgO nanoparticles can be added to a xylene, d-limonene, diesel, mineral oil, or other hydrocarbon as the carrier fluid and then pumped into place downhole. In one non-limiting example the nanoparticles in a non-aqueous fluid can be a pre-pad (i.e. preflush) or post-flush fluid stage before or after a hydraulic frac, frac-pack or gravel pack treatment.

There is additionally provided in another non-limiting embodiment a fluid that contains a base fluid (which may be aqueous-based, alcohol-based or oil-based, but is expected to be typically aqueous-based), proppants selected from the group consisting of sand, gravel, ceramic beads, glass beads and combinations thereof, a coating agent which may include an oil that is the same as or different from the base fluid, if the base fluid is oil-based, and an effective amount of the particulate additive to reduce coal fines migration. At least a portion of the nano-sized particulate additives are coated on the proppants with the coating agent.

Suitable coating agents include, but are not necessarily limited to, diesel, vegetable oils, fish oils, aromatics, solvents, mineral oils, or other hydrocarbons that accomplishes the purposes of the methods and compositions described herein. Non-limiting examples of vegetable and/or fish oils include soybean oil, corn oil, canola oil, linseed oil, peanut oil, olive oil, sunflower oil, walnut oil, coconut oil, cottonseed oil, salmon oil, cod liver oil, menhaden oil, refined and/or blended fish oils, and the like. Examples of fish oils include Salmon Oil 6:9 and Fish Oil 18:12TG from Bioriginal Food & Science Corporation. Non-limiting examples of solvents include toluene, xylene, naphthalene, d-limonene, methyl benzoate, ethyl acetate, and the like. Specific, non-limiting examples of suitable mineral oils include ConocoPhillips PURE PERFORMANCE® Base Oil, such as 80N, 110N, 225N and 600N oils. It is expected that a coal fines control product will include nanoparticles in the coating agent oil, for instance about 15 wt % nano-sized MgO particles in the 600N mineral oil. This fines control product would be added to an aqueous base fluid in a relatively small amount, in one non-limiting embodiment, from about 5 to about 100 gptg. It has been discovered that during mixing, the fines control product (i.e. the nanoparticles in oil) will plate out on or at least partially coat the particles, such as proppant particles. That is, since the base fluid is aqueous, the hydrophobic oil will be repulsed by the water and will coat the particles (e.g. proppant). How much coating of the particles that occurs is concentration dependant, based on both the amount of proppant used and the amount of fines control product used. In a non-limiting example, the coal fines control product may additionally have a surfactant present, such as an oil-wetting surfactant like sorbitan monooleate (i.e. SPAN 80 from Uniqema), to improve and/or enhance the oil-wetting of the proppant particles by the fines control product. In another non-limiting example, the presence of a surfactant may preferentially reduce the thickness of the oil layer, such as 600N mineral oil layer on proppant particles. Reduced oil layer thickness may enhance nanoparticle exposure on proppant particles. Other agents besides SPAN 80 may be employed to optimize the type and amount of oil coating or wetting on proppant particles, agents including but not necessarily limited to: sorbitan esters, ethoxylated sorbitan esters, ethoxylated alcohols, ethoxylated alkyl-phenols, alkyl-dicarboxylics, sulfosuccinates, phospholipids, alkyl-amines, quaternary amines, alkyl-siloxanes, and the like. It is not necessary that a resin be used as a coating agent or binder, and in one non-limiting embodiment, no resin is used.

It is expected that at least a portion of the particles or proppant may be "pre-coated" with the fines control agent, for instance a select portion of the proppant may be pre-coated before the job. For instance, pre-coating may be performed at the manufacturing site of the dry proppant or elsewhere. In one non-restrictive version, the fines control agent may be possibly sprayed onto the dry proppant (or other particles) before the proppant is placed in an aqueous treatment fluid.

In one non-limiting example, mineral oil as a coating agent for use with the nanoparticles has been found to be suitable for at least two reasons. First, mineral oil and like substances have an affinity to coat particles such as proppant particles as contrasted with remaining as oil droplets containing nanoparticles as a phase internal to the water-based fluid. It appears that the most stable configuration for the fines control agent once placed in an aqueous treatment fluid is to "plate out" or coat or at least partially coat any particles present. The fines control agent has been found to have an affinity to coat evenly onto the particles or proppant when it is placed in an aqueous fluid. Again, the degree of coating is primarily concentration dependent. Second, it has been found that a high molecular weight mineral oil coating agent will not disturb the fluid properties of an aqueous fluid containing a polymer gelling agent or a VES gelling agent, and thus it is an ideal media for depositing the nanoparticles onto the proppant without disturbing aqueous fluid properties.

It is theorized that the nanoparticles remain on the proppant particles primarily by electrostatic and other charges between the nanoparticle and proppant particle surfaces, however, other attractions or coupling forces may exist to initially and over the long-term keep the nanoparticles coated on the proppant particles. The inventors do not want to be limited to any particular theory. It is suspected that in most conditions the oil carrier fluid only assists the initial coating process of the nanoparticles on to the proppant particles. However, other agents may be added to the oil carrier fluid that may further enhance the initial and/or long-term nanoparticle attraction to the quartz, glass, ceramic and the like proppant particles composition. Additionally, the surface of the proppant, or a select amount of proppant, may be treated with agents that may improve the overall attraction of the nanoparticles to the proppant.

The preflush, post flush, and or base treatment fluid may also contain other conventional additives common to the CBM extraction industry such as water wetting surfactants, non-emulsifiers and the like. In another non-restrictive embodiment, the flush or treatment fluid may contain other additives including, but not necessarily limited to, viscosifying agents, other different surfactants, clay stabilization additives, scale inhibitors, scale dissolvers, polymer and biopolymer degradation additives, defoamers, biocides, and other common and/or optional components.

The invention will be further described with respect to the following Examples which are not meant to limit the invention, but rather to further illustrate the various embodiments.

EXAMPLE

Laboratory tests with 20/40 mesh (850/425 micron) sand packs (simulating proppant packs) show that 84 percent of coal fines are passed through a 12 inches long (30 cm) sand pack without a nanoparticles treatment (or coating). The coal fine fluid turbidity before passing it through the sand pack was 602 FAU (Formazin Attenuation Units), and after sand pack was still high at 505 FAU. However, only 2.5 percent of coal fines are passed through the same sand pack treated with 0.1 percent nanoparticles, where the coal fine fluid turbidity before sand pack was 815 FAU, and after passing through the nanoparticle-treated sand pack was only 21 FAU. The nanoparticles were MgO crystals having an average particle size of about 30 nm. The proportion of nanoparticles was about 8.4 pptg, based on the total amount of fluid.

Figure 2:
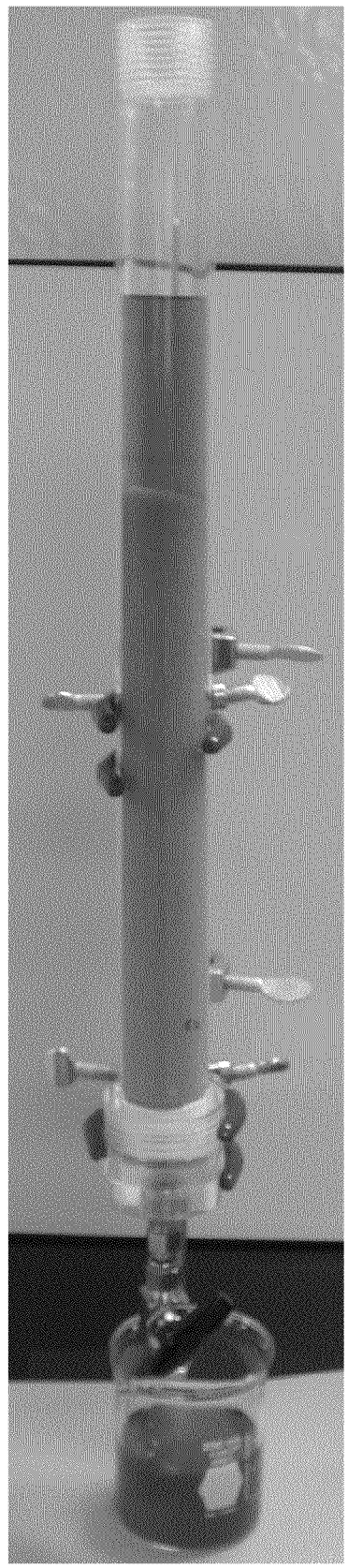
FIG. 2 is a photograph of a sand pack having tap water containing coal fines flowing through it illustrating that the coal fines migrate and flow with the water.
Figure 3:
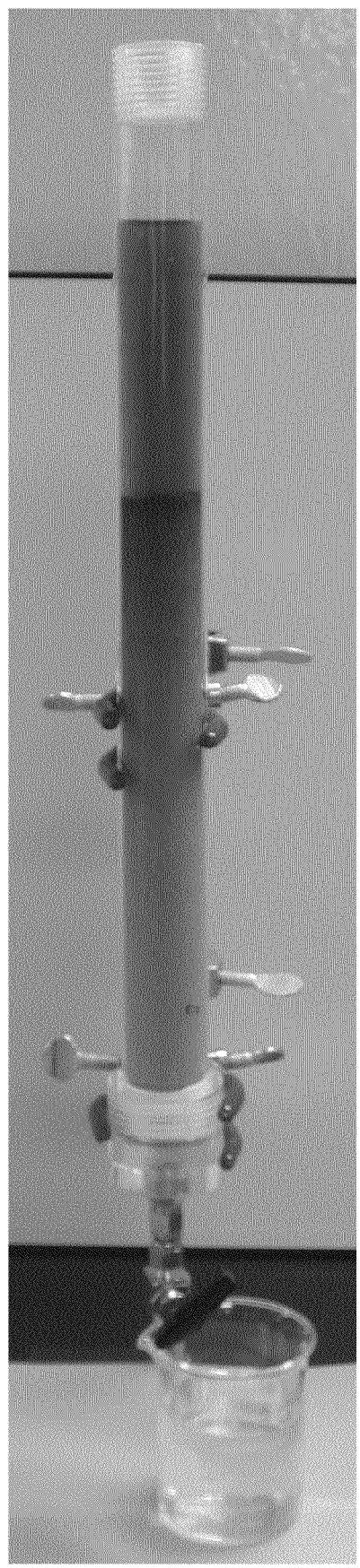
FIG. 3 is a photograph of a sand pack identical to FIG. 2 but also containing nanoparticles having tap water containing coal fines flowing through it illustrating that far fewer coal fines are passed through the pack as compared with the configuration in FIG. 3.
Figure 4:
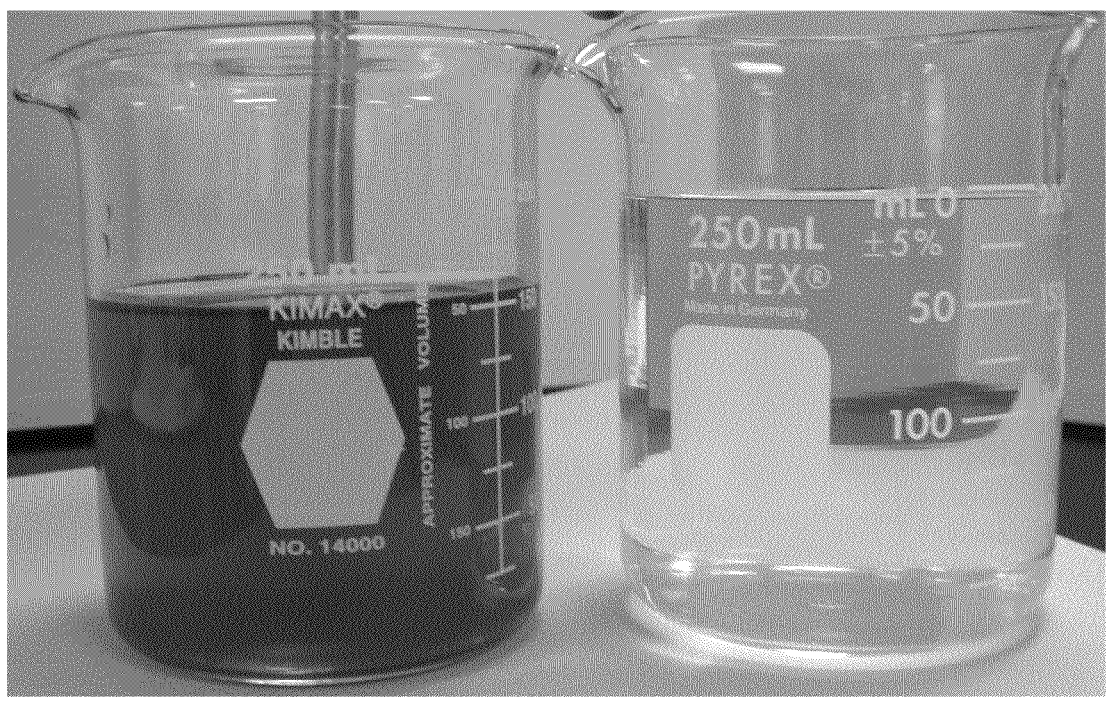
FIG. 4 is a photograph of the beakers that collected the effluents in the configurations of FIGS. 2 and 3, respectively, side by side for comparison.

FIG. 1 is a photograph of tap water flowing through the sand pack described above that contains no coal fines or nanoparticles. The effluent is clear. FIG. 2 is a photograph showing that black fluid was flowed through the sand pack not treated with nanoparticles, where the water having coal fines therein is introduced from the top and almost the same black fluid was flowed out of the pack at the bottom. FIG. 3 is a photograph showing that the same black fluid containing coal fines used in FIG. 2 was flowed through the nanoparticle-treated sand pack from the top and that instead clean filtrate was flowed out of the sand pack at the bottom. FIG. 4 is a side-by-side comparison of the effluent from the FIG. 2 photograph (left) and the effluent from the FIG. 3 photograph (right) showing the sharp contrast between the two effluents. The water in the left beaker is cloudy and black, whereas the water in the right beaker is clear and transparent.

In the foregoing specification, it will be evident that various modifications and changes may be made thereto without departing from the broader spirit or scope of the invention as set forth in the appended claims. Accordingly, the specification is to be regarded in an illustrative rather than a restrictive sense. For example, specific combinations of alkaline earth metal oxides, alkaline earth metal hydroxides, alkali metal oxides, alkali metal hydroxides, transition metal oxides, transition metal hydroxides, post-transition metal oxides, post-transition metal hydroxides, piezoelectric crystals, and pyroelectric crystals, of various sizes, brines, coating agents, and other components falling within the claimed parameters, but not specifically identified or tried in a particular composition, are anticipated to be within the scope of this invention.

The words "comprising" and "comprises" as used throughout the claims is to interpreted "including but not limited to".

The present invention may suitably comprise, consist or consist essentially of the elements disclosed and may be practiced in the absence of an element not disclosed.

What is claimed is:

1. A method for fixating coal fines in a subterranean formation comprising contacting coal fines in a subterranean formation with an amount of a particulate additive effective to reduce coal fines migration, where the particulate additive:
   has a mean particle size of 100 nm or less, and
   is selected from the group consisting of alkaline earth metal oxides, alkaline earth metal hydroxides, alkali metal oxides, alkali metal hydroxides, transition metal oxides, transition metal hydroxides, post-transition metal oxides, post-transition metal hydroxides, piezoelectric crystals, pyroelectric crystals, and mixtures thereof.

2. The method of claim 1 where the coal fines are present in a fluid selected from aqueous fluids, hydrocarbon fluids, alcohols, glycols, and mixtures thereof.

3. The method of claim 2 where the effective amount of the particulate additive ranges from about 2 to about 300 pptg (about 0.24 to about 36 kg/1000 liters) based on the fluid.

4. The method of claim 2 where fines migration in the fluid is reduced as compared to an identical fluid absent the particulate additive.

5. The method of claim 1 where:
the alkaline earth metal is selected from the group consisting of magnesium, calcium, strontium, and barium;
the alkali metal is selected from the group consisting of lithium, sodium, potassium;
the transition metal is selected from the group consisting of titanium and zinc; and
the post-transition metal is aluminum, and mixtures thereof.

6. The method of claim 1 where the mean particle size of the particulate additive is 90 nm or less.

7. A method for fixating coal fines in a subterranean coal bed comprising:
releasing methane from the subterranean coal bed;
contacting the coal fines in the subterranean coal bed with an amount of a particulate additive effective to reduce coal fines migration, where:
the coal fines are present in a fluid selected from aqueous fluids, hydrocarbon fluids, alcohols, glycols, and mixtures thereof;
the particulate additive:
has a mean particle size of 100 nm or less, and
is selected from the group consisting of alkaline earth metal oxides, alkaline earth metal hydroxides, alkali metal oxides, alkali metal hydroxides, transition metal oxides, transition metal hydroxides, post-transition metal oxides, post-transition metal hydroxides, piezoelectric crystals, pyroelectric crystals, and mixtures thereof; and
reducing fines migration as compared to an identical fluid absent the particulate additive.

8. The method of claim 7 where:
the alkaline earth metal is selected from the group consisting of magnesium, calcium, strontium, and barium;
the alkali metal is selected from the group consisting of lithium, sodium, potassium;
the transition metal is selected from the group consisting of titanium and zinc; and
the post-transition metal is aluminum, and mixtures thereof.

9. The method of claim 7 where the effective amount of the particulate additive ranges from about 2 to about 300 pptg (about 0.24 to about 36 kg/1000 liters) based on the fluid.

10. The method of claim 7 further comprising fracturing the subterranean coal bed under effective pressure with the fluid, which is a fracturing fluid comprising a proppant.

11. The method of claim 10 further comprising at least partially coating the proppant with the particulate additive.

12. The method of claim 11 where coating the proppant with the particulate additive further comprises a non-aqueous coating agent.

13. The method of claim 11 where coating the proppant with the particulate additive further comprises contacting the proppant with dry particulate additive prior to adding the proppant to the fracturing fluid.

14. The method of claim 11 where coating the proppant with the particulate additive further comprises contacting the fracturing fluid with dry particulate additive before, during or after proppant is included in the fracturing fluid.

15. The method of claim 11 where the mean particle size of the particulate additive is 90 nm or less.

* * * * *